United States Patent [15] 3,674,035
Edmiston [45] July 4, 1972

[54] THRESHING IMPLEMENTS

[72] Inventor: Dorothy Byars Edmiston, P.O. Box 855, Santa Monica, Calif. 90406

[22] Filed: Oct. 13, 1970

[21] Appl. No.: 80,292

[52] U.S. Cl. .................................................. 130/10
[51] Int. Cl. ................................................ A01f 5/00
[58] Field of Search .......................... 130/10; 17/66

[56] References Cited

UNITED STATES PATENTS

| 156,176 | 10/1874 | Rupp | 130/10 |
| 937,668 | 10/1909 | West | 130/10 |

FOREIGN PATENTS OR APPLICATIONS

| 53,662 | 5/1912 | Austria | 130/10 |

Primary Examiner—Antonio F. Guida

[57] ABSTRACT

A hand-held corn-sheller, by which an unskilled operator can shell the kernals off a husked ear of corn (maize), in the dried, fresh, or cooked condition. A single piece of sheet metal is formed so that it fits around the palm and back of the user's hand and also presents two rows of teeth extending out from the palm. Rotating the ear against the teeth causes them to inter-act in a manner which shells the corn.

1 Claim, 3 Drawing Figures

PATENTED JUL 4 1972 3,674,035

VIEW 3-3

THRESHING IMPLEMENTS

SUMMARY OF THE INVENTION

This invention relates to the threshing of crops, and specifically to the shelling of corn (maize) from the cob, after the ear of corn has been removed from the plant by known means and after the husk has been removed from the ear by known means. Primarily for dried corn, but fresh or cooked corn can be processed.

The object of this invention is to provide a corn shelling tool which is of very low cost, requires no maintenance, and can be used by an untrained person; yet will shell corn three times as fast as can be done with a knife. The device is specifically aimed at helping the people of the "developing nations" of the world.

A vast amount of the world's corn is shelled by very simple methods today. Hacking with a knife, hatchet or metal bar; or by pounding the ears in a gunny sack. Every day there are tens of thousands of man-hours spent in shelling corn by these simple methods. The intent of this invention is to free two-thirds of these man-hours for other constructive uses.

In the known art there are many highly efficient machines for shelling corn.

The known art also contains the knives, hatchets, bars, stones, and gunny sacks mentioned above. There is a large gap in the known art between the simple class of shelling devices and the complex class.

The invention consists of an implement, or device, which is made from a single sheet of metal, so formed that it can be securely gripped in one hand and providing two rows of teeth extending from the palm. These two rows of coarse teeth are so spaced that when an ear of corn is rotated against them, one row of teeth cause the other row to dislodge the kernals from the cob.

In more detail, the sheller can be considered as three regions. The first region would be the straight rigid base of 'U' shaped cross section and which contacts the palm of the hand. The second region would be the strap region which goes around the back of the hand to provide an easy means to prevent the base from turning over. This strap is formed by two tongues 3 and 4 which go around from the ends of the base. The third region is the teeth 5 and 6. These coarse teeth, from four to 10 in number, are cut into two flanges 7 and 8 turned away from the long side of the base and so extending out from the palm. The teeth axis would be across the palm, at right angles to the fingers. All edges of the base and strap are formed to a smooth radius so that they are comfortable to the hand. The length, heighth and spacing of the two rows of teeth are important, and have been determined by experiment.

To use the sheller, the operator puts one hand (left or right) through the strap or enclosure, until the base is at his palm. By use of his fingers he can grip the sheller very securely with little effort. Flexing his fingers to grip the base automatically raises the back of his hand to a firm pressure against the strap or enclosure. The sheller is securely held and the two rows of teeth protrude across his palm.

Using his other hand to hold the ear of corn at one end, he forces it against and partially between the two rows of teeth. The long axis of the ear is parallel to the teeth, or across the palm. When the ear is rotated about its long axis, one row of teeth dragging against the kernels, or the bare cob, causes the other row of teeth to dislodge the kernel. After one revolution, a length of the ear is shelled equal to the length of the device, about 4 inches. The ear is then moved along its axis and another four inches is shelled. The ear is then reversed and the bare section of the cob is used to turn the ear to complete the shelling. The kernel are not vigorously dislodged, and so they fall directly into a container, while the cob is discarded. The effort is so little that neither hand tires, but if the operator likes to change hands at intervals, the sheller is symmetrical.

Ideally, this sheller would be made from a single sheet of stainless steel, 0.050 inches thick. Since the strap and base must have "double curvature" to provide a comfortable surface for the hand, any tool to form such a device would be very expensive. However, normal ingenuity will suggest many other ways to fabricate a part which will have the same working surfaces but can be made with minimum tools. As an example, the "lost wax," or "cere perdue," casting process would produce a very similar part in brass. This casting process is in use in many of the developing nations of the world. Or, the base and teeth regions can be made from a single-curvature sheet of metal and a piece of leather can be attached to form the strap region.

It will be evident to anyone skilled in the art that a wide variety of construction methods can be used to produce an implement which will incorporate the novel features of this invention. The complete sheller, or the base region, or the teeth region can be made from sheets of stainless steel, steel, iron, brass, bronze, or aluminum alloy. The strap region can be made from the above sheet, or cotton webbing, leather, plastic sheet, or plastic webbing. All or part of the sheller can be cast or moulded from iron, steel, brass, bronze, aluminum alloy, or any rigid type of plastic.

The novel features of this invention are:

1. The sheller does shell corn faster than can be done with a knife.
2. No training period is required to be able to use the sheller. One demonstration is sufficient.
3. No maintenance is required. It operates just as well if the teeth are dull.
4. It is hand-operated. No mechanical power source is needed.
5. No lubricants or fuel are needed.
6. It is weather-proof and will not deteriorate rapidly in tropical countries.
7. It can be produced at a cost of less than 1 dollar, by simple tools.
8. It cannot be damaged by rough usage.
9. A person averse to machinery through previous injury, or due to an aversion to noise, will not object to this sheller.
10. Can only be damaged by bending or dulling. Can be straightened with pliers and sharpened with a file.

In the accompanying drawings a now preferred embodiment of the invention is shown by way of illustration and not by way of limitation.

Figure 1:
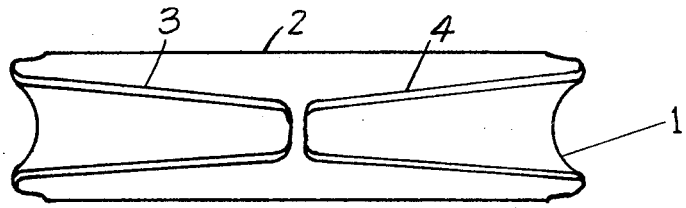
FIG. 1 is a top view of the sheller.
Figure 2:
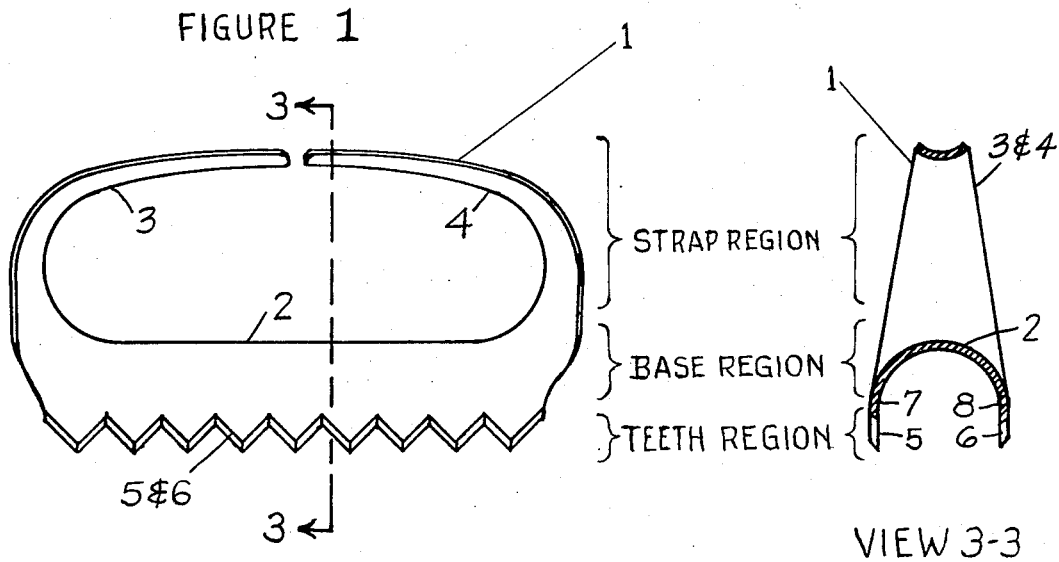
FIG. 2 is a side view of the sheller, and indicates that a sectional view is taken in the plane 3—3.
Figure 3:
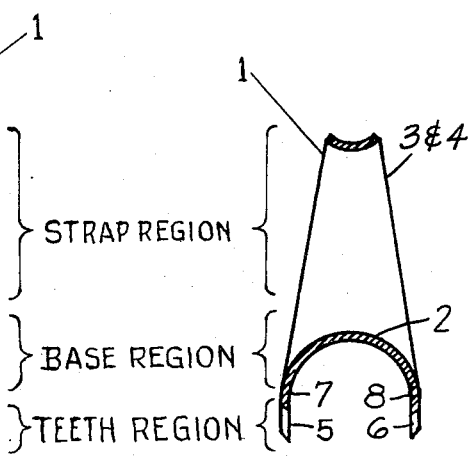
FIG. 3 is a sectional view of the sheller, taken in the plane 3—3 of FIG. 2.
Figures 4, 5, 6, 7:
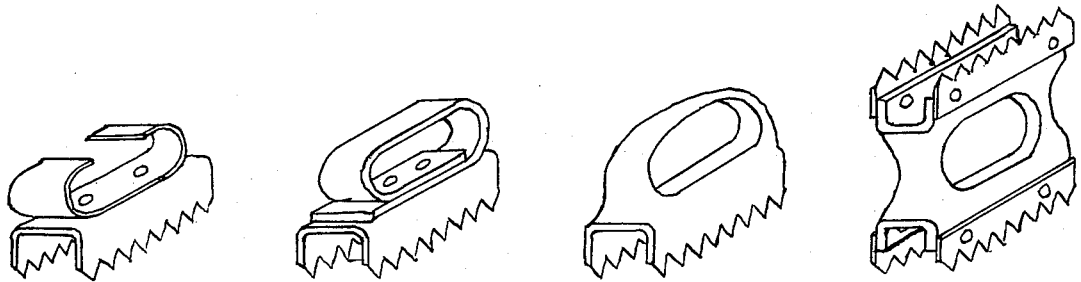

The scale of FIGS. 1, 2, and 3 is about full size and indicates that the strap region opening is of a size to comfortably fit a wide range of human hands. The opening is approximately 3½ inches (3.5 in. or 88.90 mm.) long by 1¼ inches (1.25 in. or 31.71 mm.) high.

Referring now to FIGS. 1, 2, and 3, it will be seen that the sheller, designated by the number 1, consists of a single piece of metal of a uniform thickness throughout. The sheller 1 is so shaped that it consists of three regions.

In the sheller 1 there is a straight region 2 which is flanged for stiffness and is designated as the base region.

Extending from each end of the above base region of the sheller 1 is a smoothly curved tongues 3 and 4: These two tongues curve back to almost touch each other at the center. They need not be attached together at the center because they are sufficiently flanged to resist any loads the human hand can apply. These two extensions of the base form the above-mentioned strap region.

Extending from the two long sides of the aforementioned base region of the sheller 1 are short flanges 7 and 8 carrying from four to ten coarse teeth. These flanges for the teeth 5 and 6 extend from the base region on the side opposite from the strap region and form the teeth region of the sheller 1. The distance between these flanges of the teeth region is slightly less than the diameter of the cob of the average ear of the type of corn used for human food. The height of the flanges from the base region is one-half the distance between them. Experimentation and actual use have proven that the distance between flanges must be approximately 1 inch, plus or minus one-tenth of an inch. (1.0 ± 0.1 in. or 2.5 ± .25 cm.)

As shown in FIGS. 1, 2, and 3, the metal of the base region and of the strap region is curved to provide a comfortable surface for the palm and the back of the hand of the human operator.

The sheller 1 is quadri-laterally symmetrical.

The material from which the sheller 1 would best be fabricated is stainless steel sheet of 0.050 thickness. (0.050 in. or 1.270 mm.) Any thickness from 0.020 to 0.125 would be satisfactory. Other suitable metals would be iron, steel, aluminum alloy, copper alloys, or composites. Rigid plastic can be used. Also the sheller 1 can be cast or moulded from iron, steel, aluminum alloy, brass, or any rigid plastic.

Protective and ornamental finishes such as paint, galvanizing, anodizing or a combination, all in the known art, can be applied to the sheller 1.

It is not essential to the invention that the sheller 1 be of one piece.

The invention is not restricted to the form of execution shown in the drawing. It is of course possible to vary the construction of the part or parts provided the overall functioning of the part or parts is not changed in so doing. It is only important that the hand can securely grip two rows of teeth so spaced as to dislodge corn kernels from a cob or ear of corn when said cob or ear is rotated against the teeth.

What is claimed as new and desired to be secured by Letters Patent is:

1. A hand-held shelling implement for dislodging kernels of corn from the cob, comprising a sheet-metal base member of inverted "U"-shaped cross section and having parallel legs, said base being of a length sufficient to be grasped by an operator; each of the parallel legs thereof terminating in a plurality of teeth; each end of said base member having a tongue-like extension disposed over and substantially parallel to said base and spaced therefrom to permit the insertion of a hand therebetween; the tongue-like extensions being of arcuate cross section; whereby the implement may be grasped by one hand and moved across an ear of corn with the teeth in contact with the kernels thereof to remove the same.

* * * * *